United States Patent [19]

Eichinger et al.

[11] 4,020,934

[45] May 3, 1977

[54] FRICTION CLUTCH WITH YIELDABLE HYDRAULIC OPERATOR

[75] Inventors: Johann Eichinger, Putzbrunn; Richard Strehler, Unterfoehring; Gert Burzlauer, Anzing, all of Germany

[73] Assignee: Carl Hurth, Maschinen- und Zahnradfabrik, Munich, Germany

[22] Filed: Oct. 14, 1975

[21] Appl. No.: 621,674

[30] Foreign Application Priority Data

Oct. 31, 1974 Germany .......................... 2451670

[52] U.S. Cl. ...................... 192/87.17; 192/109 F
[51] Int. Cl.² .......................................... F16D 25/10
[58] Field of Search ......... 192/88 A, 85 AA, 87.17, 192/109 F, 86

[56] References Cited

UNITED STATES PATENTS

| | | | |
|---|---|---|---|
| 2,620,814 | 12/1952 | Hobbs | 192/109 F |
| 2,621,769 | 12/1952 | Cardwell et al. | 192/88 A |
| 2,809,308 | 10/1957 | Turner | 192/88 A X |
| 3,098,549 | 7/1963 | Schick et al. | 192/87.17 |
| 3,335,836 | 8/1967 | Swanson | 192/109 F X |
| 3,612,237 | 10/1971 | Kaisha | 192/109 F X |

Primary Examiner—Benjamin W. Wyche
Attorney, Agent, or Firm—Woodhams, Blanchard and Flynn

[57] ABSTRACT

Double-acting hydraulic clutches. In a double-acting hydraulic clutch of the type having a pair of oppositely movable pistons for effecting engagement of clutch plates there is provided a resilient partition separating the chambers occupied by each of said pistons. Such resilient partition yields sufficiently upon the supplying to a given cylinder of energizing fluid whereby without slowing the entry of such fluid the shock of the in-rushing fluid is softened and undesired suddenness, or grab, in clutch engagement is minimized.

7 Claims, 2 Drawing Figures

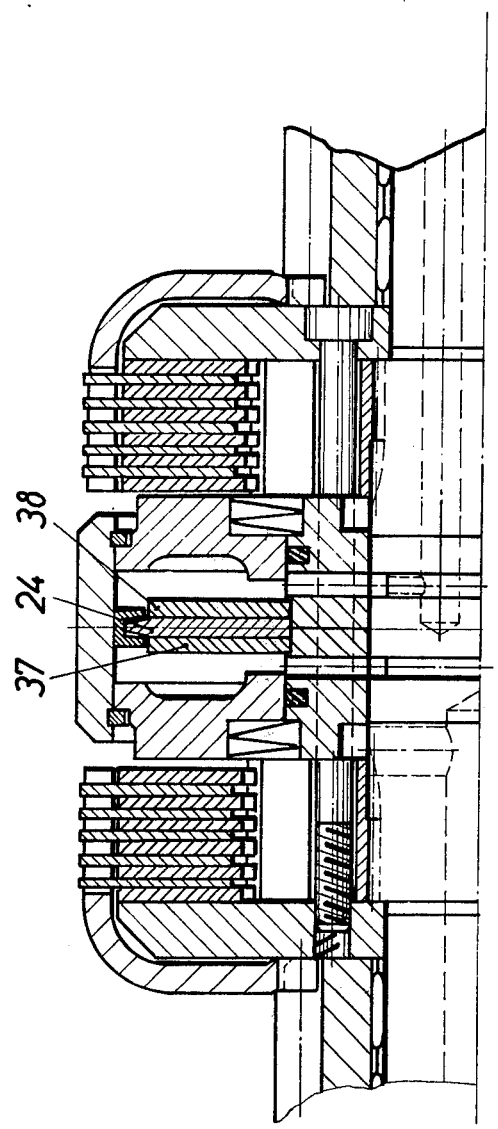

FRICTION CLUTCH WITH YIELDABLE HYDRAULIC OPERATOR

FIELD OF THE INVENTION

The invention relates to a clutch having a least one friction member which is associated with one clutch half and at least one other friction member which is associated with the other clutch half, said friction members being urgeable against each other by pressure responsive means responsive to any suitable pressure medium, and particularly to a type of such clutch including means for minimizing the shock of engagement between said plates in response to sudden application of pressure fluid.

BACKGROUND OF THE INVENTION

Friction clutches are already known in which the friction members, for example friction plates, are urged into engagement with one another by a piston operative in a cylinder. Upon initiating an operation of such clutches, the pressure of the pressure medium often builds up suddenly, so that these clutches often move with a considerable force (German Pat.No. 862,237). It is known to diminish the impact or grab thereby occuring by providing in the hydraulic unit a pressure fluid chamber or storage cylinder. This increases the expense of the hydraulic unit and causes delay in operation (German Pat. No. 933,186).

Furthermore a friction clutch is known in which for damping the initially force auxiliary pistons are provided which form inlet pressure chambers and each such auxiliary piston becomes effective before the main engaging element, through which a graduated coupling power is effected. This, however, results in a very complicated construction (German AS No. 1,268,451).

Finally a hydraulically operated clutch unit is known in which engagement takes place quickly through resilient load absorption. For this purpose a partition wall defining a counter-pressure chamber is provided within the movable coupling housing, which partition wall divides into two chambers the space defined by the housing. These two chambers are, when the clutch is uncoupled, always maintained at a relatively low pressure. Openings and valves are provided in the counter-pressure chamber, which valves are urged by the low pressure liquid into such positions as to permit the stream of liquid to flow through the openings. This clutch also is very expensive (German OS No. 1,400,421).

SUMMARY OF THE INVENTION

Thus, the present invention has the major purpose of providing an easily engageable clutch having minimum grab and in which the means for minimizing such grab is provided at a minimum of manufacturing expense.

The basic purpose of the invention is attained by a clutch, which has resilient means comprising one wall of the chamber comprising the pressure cylinder. A particularly money-saving construction is obtained by providing a yieldable membrane as the wall of the pressure cylinder opposite the clutch actuating piston. A hydraulic double clutch can then be constructed by providing a pair of oppositely actuable pistons for engaging spaced sets of engageable clutch plates and positioning a yieldable wall between said pistons to divide the chamber occupied thereby into two separate clutch energizing cylinders. In such device the resilient wall may comprise a membrane fixed with respect to the clutch frame at its center and movable at its periphery with, and in sealed realtionship to, the inner surface of a surrounding chamber wall.

A further development wherein such a piston ring is used around the perimeter of said resilient walls results in only minimal friction, prevents chatter and is otherwise advantageous.

The spring characteristic of the membrane and therefore the damping characteristic of the device according to the invention can be varied by using resilient but usually metallic reinforcement on one or both sides of said resilient partition.

Further advantages and characteristics of the invention can be taken from the following description.

The invention is discussed in connection with exemplary embodiments which are illustrated in FIGS. 1 and 2.

BRIEF DESCRIPTION OF THE DRAWINGS

They show:

FIG. 2 illustrates a different exemplary embodiment of the invention.

DETAILED DESCRIPTION

Figure 1:
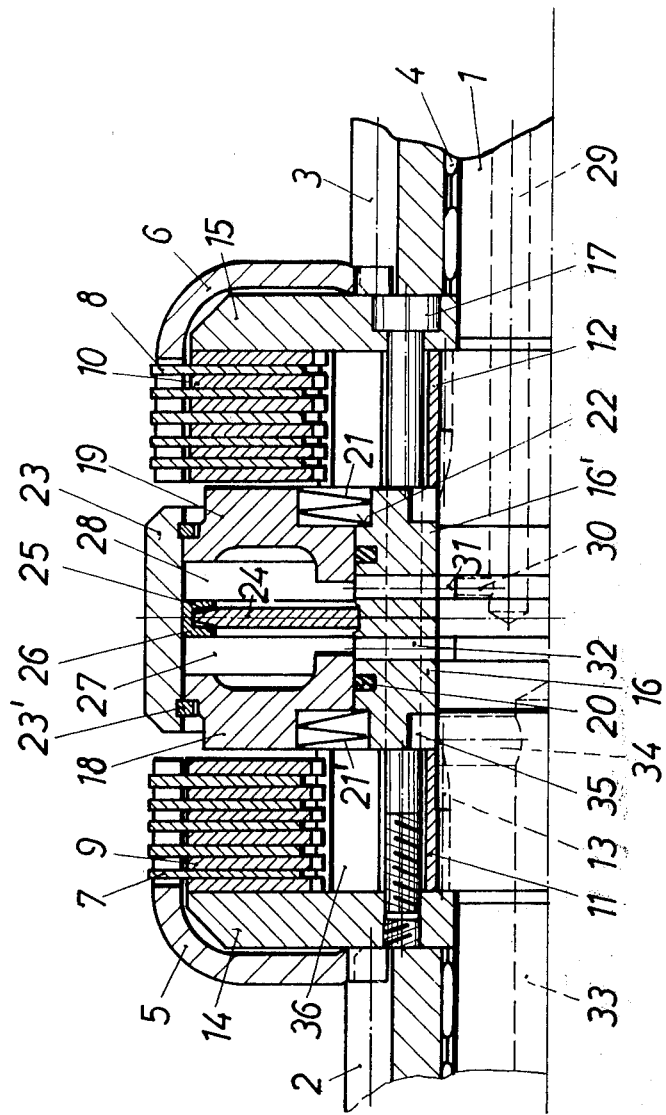
FIG. 1 illustrates schematically an exemplary embodiment of the invention.

FIG. 1 illustrates schematically a longitudinally cross-sectional view of a hydraulically shiftable double clutch. A shaft 1 is to be selectively coupled with gears 2, 3 which are supported rotatably on the shaft by bearings 4. Two clutch housings 5, 6 are arranged centrally with respect to and adjacent said gears and are connected fixedly with respect to rotation by teeth to said gears. So-called outer plates 7, 8 conventionally engage said clutch housings. For this purpose they have external teeth, which project into corresponding slots of the clutch housings. So-called inner plates 9, 10 are arranged between the outer plates, which inner plates are provided conventionally with internal teeth which engage external teeth connected fixedly with respect to rotation to the shaft. In the exemplary embodiment, the said external teeth are provided on each clutch sleeve 11, 12, of each of which is arranged fixedly with respect to rotation on the shaft, for which purpose corresponding splines 13 are provided. The external teeth can also be arranged directly on the shaft. A pressure plate 14, 15 is provided between each respective clutch sleeves and the gears. Two supply control sleeves 16, 16' are supported between the two clutch sleeves on the shaft and bear against one another in the center of the clutch. The two supply control sleeves can also be united to a single one. The pressure plates, clutch sleeves and supply control sleeves are held together by screws 17, whereby the pressure plates rest against shoulders of the shaft and are thus held axially. Two pistons 18, 19 are supported longitudinally movably on the supply control sleeves 16, 16'. The bearing points have seals 20. Springs 21, 21' lie between the pistons 19, 18 respectively and the respective clutch sleeves 11, 12 and urge both axially apart. The springs are initially tensioned because they bear in the rest control position against the shoulder 22 of the supply control sleeve. The pistons 18, 19 are surrounded by a cylindrical sleeve 23. The pistons are secured against axial shifting relatively to the sleeve toward the openings of the sleeve by snap rings 23' or the like. If thus the piston 18 is for example moved to the left, the piston 19 is carried along through the snap rings and the sleeve 23. The pressure of the springs 21', however, acts only onto the so-energized piston and not onto the other one.

A partition wall exists in the center between the two pistons, which is constructed according to the invention as a resilient membrane 24. Said membrane is sealingly centered and axially held at its inner circumference on the supply control sleeves, for which purpose the supply control sleeves have corresponding shouldered portions. The axial mounting can also be accomplished in other ways as desired, for example by snap rings. The membranes engages at its outer periphery an annular groove 25, which is provided in a piston ring 26. The annular groove is advantageously constructed such that the side walls thereof converge outwardly. The membrane is in this area tapered correspondingly such that it lies snugly in the piston ring, provided however, that a small movement between the piston ring and membrane is permitted in order that the membrane can bend. The piston ring bears against the inner wall of the sleeve. The discontinuity (not shown) of the piston ring is sealed conventionally, as by overlapping same. It would also be possible to use a so-called O-ring as seal if the membrane is constructed such that the O-ring can be received by it. The membrane can also be sealed in other ways, for example by prevulcanized packing washers which can be very advantageous.

The space which is enclosed by the sleeve and the piston is divided by the membrane into two chambers 27, 28, which can selectively be pressurized with pressure medium, for example oil, in any conventional manner. For example, two conduits are provided in the shaft, of which the one is shown and identified with reference numeral 29. From these conduits communication is provided through respectively connected radial openings 30, thence respectively through a pair of annular grooves 31 and connected openings 32 to the said chambers. Pressure medium is thus introduced into, or discharged from said chambers by means of the conduits 29 and their respective connecting paths.

Further longitudinal openings 33 are provided in the shaft, through which lubricant is supplied to the plates. For this purpose in the illustrated embodiment radial connecting openings 34 are provided in the shaft, which openings 34 lead the lubricant into the clutch, from where it can reach the plates through annular recesses 35, the passage holes for the screws 17 and slots 36, which are provided in the clutch sleeves.

If for example pressure medium is introduced to the left chamber 27, the chamber 28 is connected to the return passageway. The control means herefore are known and are therefore not shown. The piston 18 moves to the left and takes along the piston 19 through the sleeve 23. At the instant at which the piston 18 contacts the plates, namely at the instant at which, without the invention, the pressure impact would occur, the membrane yields to the right due to the pressure increase and thus absorbs the impact.

In the embodiment of the invention according to FIG. 2, supporting cup springs 37, 38 or the like are provided on both sides of the membrane 24, which cup springs change the spring characteristic of the membrane. The illustration in FIG. 2 is only exemplary for the thickness of the membrane and form and number of the supporting springs can be varied freely depending on the desired spring characteristic and damping action of the membrane.

The invention has the advantage that the damping device can be installed virtually without additional effort over conventional designs, and hence without additional cost, because the partition wall must in any case be present in double clutches. According to the invention, the only change involved is that the membrane is usually constructed thinner than the conventional partition wall and it is made of a resilient material.

In the embodiment according to FIG. 2, additional springs 37, 38 are provided but they are in relationship to the known damping devices very inexpensive. Furthermore this construction has the advantage that the damping action can be varied at an optimum by simple means, namely by exchange of the supporting springs and by appropriately dimensioning the membrane.

Although a particular preferred embodiment of the invention has been disclosed in detail for illustrative purposes, it will be recognized that variations or modifications of the disclose apparatus, including the rearrangement of parts, lie within the scope of the present invention.

The embodiments of the invention in which an exclusive property or privilege is claimed are defined as follows:

1. A hydraulically shiftable double actuator friction clutch, comprising:
   a first rotatable membar having a pair of separate and spaced apart first friction members supported thereon for movement therewith and relative thereto;
   a pair of spaced apart second rotatable members mounted for relative rotational movement and relative to said first rotatable member, each of said second rotatable members having secured thereto at least one second friction member supported for movement therewith and relative thereto, each of said second friction members being located to move into and out of engagement with one of said separate pair of said first friction members;
   chamber means having a pair of pistons reciprocally mounted therein each for movement into and out of engagement with one side of said pairs of said first and second friction members;
   abutment means adjacent the other side of each of said pairs of said first and second friction members;
   a resiliently flexible membrane in said chamber means located between said pair of pistons and free of connection thereto to thereby define a pair of chambers each having one of said pistons therein;
   passageway means for selectively suppying pressurized fluid media to selected ones of said pair of chambers to effect an engagement of one of said pistons with said one side of each said pairs of said first and second friction members to clamp said friction members between said one piston and said abutment means, said resiliently flexible membrane flexing sufficiently upon the supply to a selected one said pair of chambers of pressurized fluid media whereby without slowing the entry of said fluid media the shock of the in-rushing fluid media is softened and undesired suddenness, or grab, in clutch engagement is minimized.

2. A hydraulically shiftable double actuator friction clutch according to claim 1, wherein said resiliently flexible membrane includes means for sealingly centering and axially holding said membrane on said first rotatable member.

3. A hydraulically shiftable double actuator friction clutch according to claim 2, wherein said means includes a seal ring slidingly engaging the internal wall of said chamber means and is secured to said resiliently flexible membrane.

4. A hydraulically shiftable double actuator friction clutch according to claim 3, wherein said seal ring has a U-shaped cross section with the legs of the U gripping opposite sides of said membrane.

5. A hydraulically shiftable double actuator friction clutch according to claim 1, wherein said membrane has at least one disklike spring secured thereto on at least one side thereof to effect a change in the resilient characteristics of said membrane.

6. A hydraulically shiftable double actuator friction clutch according to claim 1, wherein said pairs of said first and second friction members include a plurality of said frist and second friction members in each pair.

7. A hydraulically shiftable friction clutch, comprising:
  a first rotatable member having at least one friction member supported thereon for movement therewith and relative thereto;
  at least one second rotatable member mounted for relative rotational movement relative to said first rotatable member, said second rotatable member having secured thereto at least one second friction member supported for movement therewith and relative thereto, said second friction member being located to move into and out of engagement with said first friction member;
  chamber means having at least one piston reciprocally mounted therein for movement into and out of engagement with one side of said first and second friction members;
  abutment means adjacent the other side of said first and second friction members;
  a resiliently flexible membrane in said chamber and defining one wall thereof said resiliently flexible membrane being free of connection to said piston; and
  passageway means for supplying pressurized fluid media to said chamber to effect an engagement of said piston with said one side of said first and second friction members to clap said friction members between said piston and said abutment means, said resiliently flexible membrane flexing sufficiently upon the sypply to said chamber of pressurized fluid media whereby without slowing the entry of said fluid media the shock of the in-rushing fluid media is softened and undesired suddenness, or grab, in brake engagement is minimized.

* * * * *